United States Patent [19]
Motz et al.

[11] Patent Number: 5,247,446
[45] Date of Patent: Sep. 21, 1993

[54] CONTROL UNIT WITH AN INTERFACE FOR MOTOR VEHICLES THAT IS CAPABLE OF BEING PROGRAMMED WITH NEW CONTROL DATA AND OPERATING PROGRAMS

[75] Inventors: Ulrich Motz, Oehringen; Richard Schleupen, Grossingersheim; Juergen Zimmermann, Schwieberdingen; Michael Gundlach, Asperg, all of Fed. Rep. of Germany

[73] Assignee: Robert Bosch GmbH, Stuttgart, Fed. Rep. of Germany

[21] Appl. No.: 647,044

[22] Filed: Jan. 29, 1991

[30] Foreign Application Priority Data

Feb. 6, 1990 [DE] Fed. Rep. of Germany ........ 4003507

[51] Int. Cl.$^5$ ............................................. F02P 15/00
[52] U.S. Cl. ............................ 364/431.12; 364/431.04; 123/674; 123/690
[58] Field of Search ............... 364/431.05, 431.11, 364/431.12, 431.01, 431.03, 431.04; 123/416, 417, 674, 690

[56] References Cited

U.S. PATENT DOCUMENTS

| | | | |
|---|---|---|---|
| Re. 31,997 | 10/1985 | Klötzner | 364/431.12 |
| 4,355,360 | 10/1982 | Asano et al. | 364/431.11 |
| 4,751,633 | 6/1988 | Henn et al. | 364/431.12 X |
| 4,908,792 | 3/1990 | Przybula et al. | 364/431.12 X |
| 5,138,548 | 8/1992 | Kienle | 364/431.12 X |

Primary Examiner—Jack B. Harvey
Assistant Examiner—Edward Pipala
Attorney, Agent, or Firm—Kenyon & Kenyon

[57] ABSTRACT

A digital control unit, in particular an ignition and/or injection control unit for motor vehicles, is provided. The control unit has a microcomputer (10) and a permanently connected main storage (12) containing control data and operating programs. This main storage unit (12) is designed as a read/write memory (RAM, EEPROM or the like). A control program that runs when the control unit is switched on is provided in an auxiliary storage (13) designed as a permanent storage (ROM, EPROM or the like). Based on a load instruction, the control program controls the loading of the main storage (12) from an external storage medium via an interface (21). The control program also automatically transfers the operating program access of the microcomputer (10) to the main storage (12). In this manner, software modifications can easily be subsequently implemented in the control unit when, for example, improvements or variations in program data or characteristic data are available and desired. No external programming device is required to modify data.

17 Claims, 2 Drawing Sheets

CONTROL UNIT WITH AN INTERFACE FOR MOTOR VEHICLES THAT IS CAPABLE OF BEING PROGRAMMED WITH NEW CONTROL DATA AND OPERATING PROGRAMS

FIELD OF THE INVENTION

The present invention relates to a digital control unit, in particular to an ignition and/or injection control unit for motor vehicles, which has a microcomputer and a permanently connected main storage containing control data and operating programs.

BACKGROUND OF THE INVENTION

Digital control units have been used in many different ways in modern motor vehicles. They not only control the ignition and/or fuel-injection operations, but also perform a multitude of additional functions, such as controlling the gear unit, regulating exhaust gas, braking, skidding, and the like. Combined control operations can also be integrated into one control unit.

The main storage containing control data and operating programs is usually designed as a permanent storage. The main storage may be embodied as a ROM or EPROM. German Patent 4128900, for example, discloses this type of control unit with a permanent storage. The disadvantage of this permanent storage is that it is very difficult to make subsequent modifications of the data or programs. To make such modifications, the appropriate permanent storage must be unsoldered and replaced by another one. Generally, the entire printed circuit board or the entire control unit must be exchanged. Therefore, almost exclusively, only new vehicles are able to undergo software improvements or have software functions added, while vehicles which have already been delivered do not do so for cost reasons.

Another consequence of using these permanent storage units is that one type of motor vehicle invariably contains the same program and the same control data, so that adaptations to individual preference and driving style are not possible.

The use of a read/write memory as the main storage so that the operating programs or control data can be modified is known from the use of emulation devices for the test phase of a motor vehicle. However, this requires the use of a special control unit with interchangeable storage units and an external programming device to allow the programs and data to be modified. These types of control units, therefore, cannot be used for serial applications.

SUMMARY OF THE INVENTION

The present invention provides a digital control unit in which, through a simple design suitable for series construction, subsequent operating program and control data modifications can easily be made without requiring an external programming device. The only requirement is the connection of an external storage medium while the data transfer is controlled by the built-in auxiliary storage. This results in an automatic system transfer so that the microcomputer accesses its operating programs from the main storage designed as a read/write memory.

Subsequent software improvements to the operating programs and control data can easily be made in the workshop or by means of long-distance data transmission, for example, via a telephone modem. Also, different software versions can easily be assigned to one vehicle type. These versions, such as a sporty-driving technique, an economical-driving technique, a comfortable-driving manner, or the like, can then be suspended again.

One can also easily furnish the driver with these types of software versions, for example, in the form of disks or cassettes, so that the driver can reload the main storage himself. A further advantage of the present invention is that test programs can be loaded in the workshop, making it possible to test certain driving conditions more accurately. Even when additional (booster) sets are subsequently mounted on the motor, their functions can be incorporated by loading a new program.

The control program contains a testing program which expediently executes the system transfer to the main storage only when the data are properly available there. This testing program not only recognizes through plausibility tests if a faulty program exists, but also if a program is loaded at all. If there is a faulty program or no program, no system transfer to the main storage takes place, and an error signal is generated and/or a utility program (contained in the control program) maintains control functions.

To implement the system transfer, a reversing logic is provided, which expediently switches control lines between the microcomputer, the main storage and the auxiliary storage. This logic can be incorporated in the microcomputer, particularly when the main and auxiliary storage units are incorporated. In this manner, the system transfer can be accomplished with very low software expediture.

A serial interface is particularly suited as an interface because it provides a greater flexibility in preparing the possible storage media for loading new programs. Above all, in this manner, it is possible to transmit data over telephone and radio.

A pre-set signal or signal sequence at the serial interface, or a signal from a switch can serve as a load instruction. The storage medium needs to be connected and enabled, while the loading of the data into the main storage is automatically controlled by the auxiliary storage program. To this end, the control program has a program for expediently testing the presence of such a load instruction.

The auxiliary storage can be an external permanent storage. However, microcomputers with internal permanent storage that is applicable as an auxiliary storage can also be used.

BRIEF DESCRIPTION OF THE DRAWINGS

Two exemplary embodiments of the invention are depicted in the drawings and clarified in greater detail in the following. The Figures depict.

DETAILED DESCRIPTION OF THE INVENTION

Figure 1:
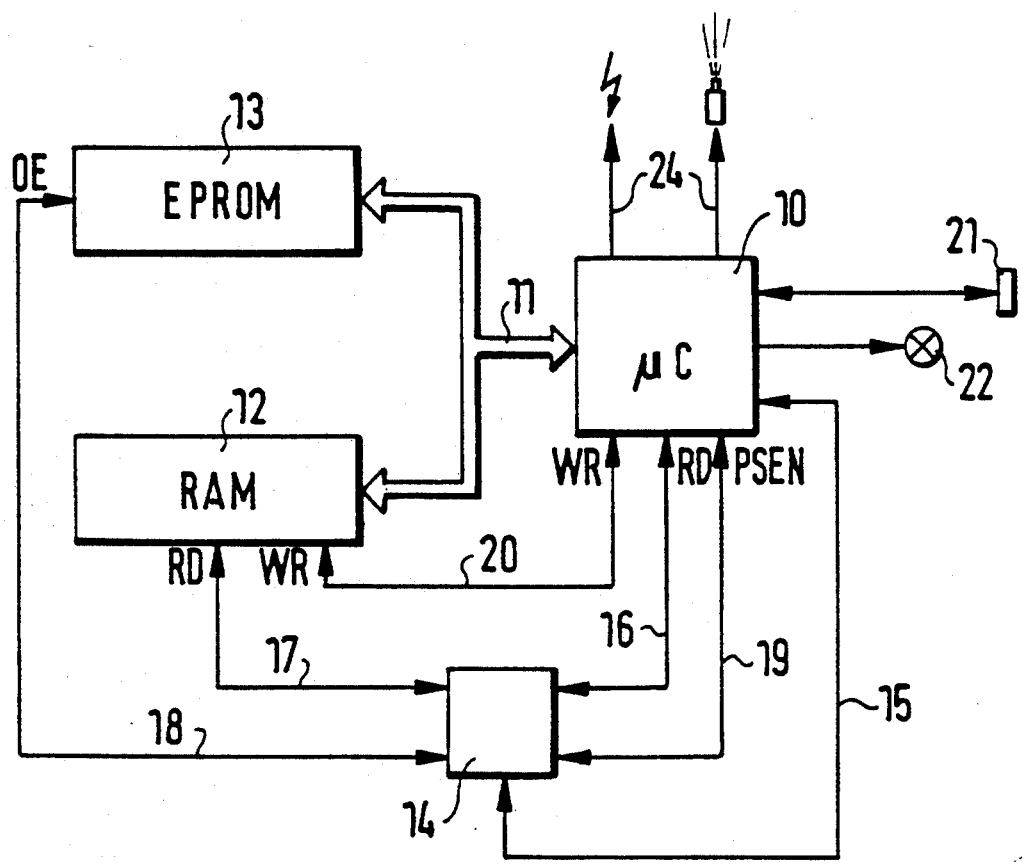
FIG. 1 is a block diagram of a first embodiment of the control unit of the present invention which has an external main and auxiliary storage units.

In the case of the embodiment depicted in FIG. 1, a microcomputer 10 is connected via a data/address bus 11 ("bus" 11) to a main storage 12 designed as a read/write memory (in this case a RAM) and to an auxiliary storage 13 designed as a permanent storage (in this case an EPROM). In principle, other permanent storage, such as a ROM, a PROM, or the like, can be used as the auxiliary storage 13. The microcomputer 10 serves to control fuel-injection functions, as indicated by appropriate symbols. In principle, other functions can be controlled or regulated, as indicated earlier.

The main storage 12 is connected to a (small) storage battery which is constantly charged during operation. For reasons of simplification, this known type of battery buffering is not described in greater detail. When the control unit is switched off, the data content in the main storage 12 is, therefore, retained for a longer time. The main storage 12 can also be designed as an EEPROM.

To switch over the program/data access of the microcomputer 10 either to the main storage or to the auxiliary storage, a reversing logic 14 is provided, which is designed, for example, as an 8-bit comparator. This 8-bit comparator is activated on the basis of a specifically input address, and implements the system transfer directly or by means of a flip-flop. To this end, the reversing logic 14 can also be connected to the bus 11.

The control command for the system transfer between the main storage 12 and the auxiliary storage 13, the program and data storage units, is executed from the microcomputer 10 via a control line 15. To read-out data from the main storage 12, a read-out command RD (read) is sent from the microcomputer 10 via a control line 16, and a corresponding read command RD is sent to the main storage 12 via a control line 17. At the same time, via a control line 18, the auxiliary storage 13 receives an inhibit instruction OE (output enable), which blocks the read outputs. To read out the data from the auxiliary storage 13, the signals on the control lines 17, 18 are dropped (i.e., inverted).

A serial interface 21, which is suited for connection to an external storage medium (a mass storage unit), is coupled to the microcomputer 10. The mass storage unit can be a disk, CD, tape, music cassette, or the like, whereby a connection over telephone, telephone modem, radio, or the like, is also possible. A control signal PSEN on a control line 19 serves to read-in external data from the external storage medium via the serial interface 21. The subsequent writing-in (storing) of the read-in (input) data into the main storage 12 takes place by means of a control signal WR (write) on a control line 20.

A control program, which is effective immediately after the microcomputer 10 is turned on (i.e., initialized), is permanently stored in the auxiliary storage 13. The data is stored in the auxiliary storage 13 by means of the initialization. A test program included in the control program tests whether program and/or control data are available in the main storage 12, and if so, whether they are properly available. If they are, then a system transfer is carried out in the described manner so that the microcomputer 10 accesses data from the main storage 12, which at this point defines the control functions. If no program or a defective program exists in the main storage 12, no system transfer to the main storage 12 takes place, and the control functions are maintained by means of a utility program contained in the auxiliary storage 13. At the same time, a warning light 22 is switched on, which indicates missing or faulty memory contents in the main storage 12.

In a simpler version, the auxiliary storage 13 does not have this type of utility program, so that the microcomputer 10 only switches on the warning light 22, and moreover does not initiate its operation.

A load instruction serves to load program and control data into the main storage 12 either for the first time or to overwrite such data later on. This load instruction is applied, for example, by the external storage to the serial interface 21. After the initialization phase, the control program in the auxiliary storage 13 checks whether such a load instruction is present. If one is recognized, the data are loaded into the main storage 12, as described previously. Only after these data are loaded does the described system transfer to the main storage 12 take place.

Of course, it is also possible to permanently store a portion of the required data in the auxiliary storage 13, and to variably store only the other portion in the main storage 12. In this case, a data access to both storage units would have to take place during the operation.

Figure 2:
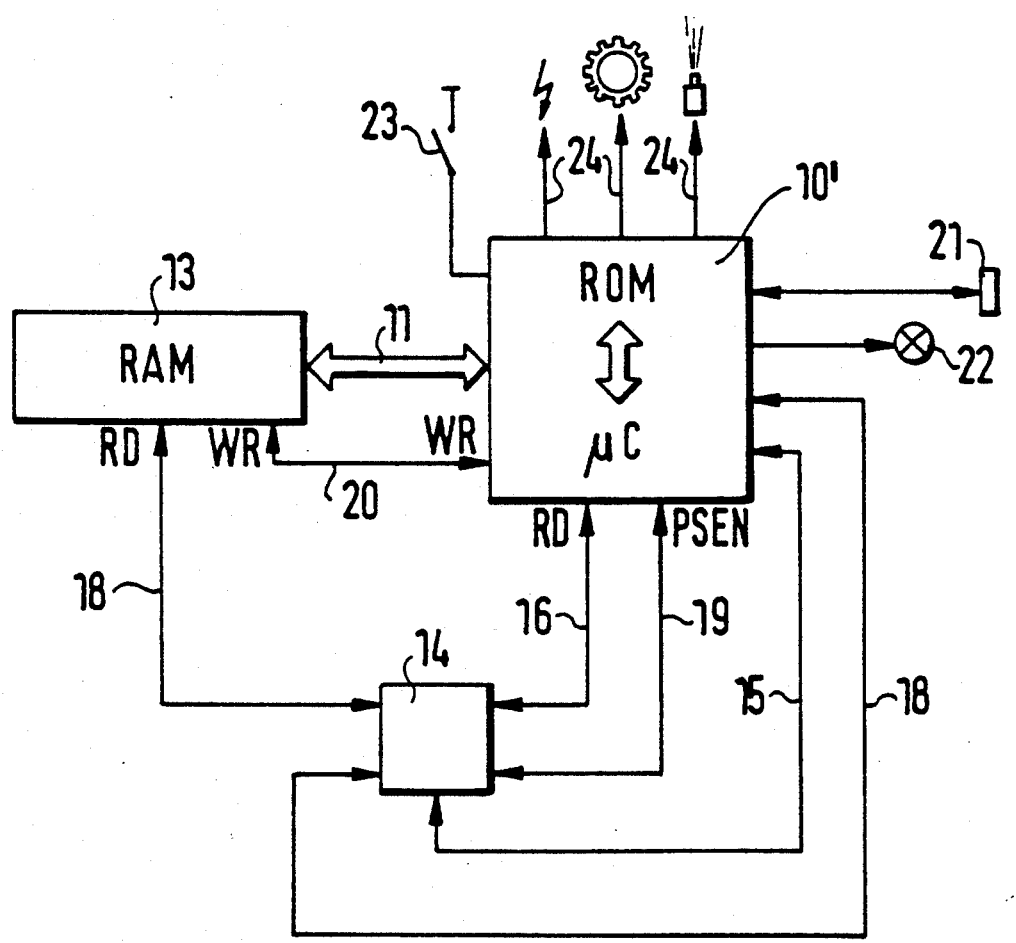
FIG. 2 is a block diagram of a second embodiment of the control unit of the present invention which has an external main storage unit and an internal auxiliary storage unit.

The second exemplary embodiment, depicted in FIG. 2, corresponds substantially to the first exemplary embodiment. In contrast to the first exemplary embodiment, however, the external auxiliary storage 13 is no longer present. Instead, an internal permanent storage (ROM) is contained as an auxiliary storage in the microcomputer 10', whereby an internal connection is realized by an internal bus. To enter a load instruction, a switch 23, which of course can be designed as a pushbutton, is now mounted on the microcomputer 10'. When this switch 23 is closed, the corresponding input is connected to ground, and the control program interprets this as a load instruction.

The symbols next to the control outputs 24 of the microcomputer 10' clarify that, in addition to the ignition and injection function, a gear-unit-control function can also be included in the control unit. Further functions can likewise be included, as described earlier.

By slightly altering the exemplary embodiment depicted in FIG. 2, the external main storage 13 can also be replaced by an internal main storage, i.e., one that is incorporated in the microcomputer 10'. It is also possible to incorporate the reversing logic 14 in the microcomputer through software and/or hardware, so that it can be eliminated as an external component. In principle, this incorporation of the reversing logic is also possible in the case of external main storage and auxiliary storage units.

The terms and expressions that are used herein are terms of expression and not of limitation. And there is no intention in the use of such terms and expressions of excluding the equivalents of the features shown and described, or portions thereof, it being recognized that various modifications are possible in the scope of the invention.

We claim:
1. A digital control unit useful for controlling ignition and/or fuel injection for motor vehicles, comprising:
a microcomputer (10, 10') for controlling at least one of the ignition and fuel injection functions;
a main storage (12) coupled to the microcomputer, the main storage containing control data and operating programs, with the main storage (12) being designed and arranged as a read/write memory; and
an auxiliary storage (13) that is designed and arranged as a permanent storage, with the auxiliary storage containing a control program that runs when the control unit is in an on condition, which, based on a presence or absence of a load instruction, controls loading of control data and operating programs from an external device via an interface (21) to the main storage (12), and which controls access by the microcomputer (10,10') to the control data and operating programs stored in the main storage (12).

2. The digital control unit according to claim 1, wherein the control program further includes a testing program for controlling system transfers from the main storage (12) when control data and operating programs are properly available at the main storage.

3. The digital control unit according to claim 1 or 2, wherein the control unit further includes reversing logic (14) operative with the microcomputer (10, 10'), main storage (12), and auxiliary storage (13) to implement system transfers.

4. The digital control unit according to claim 3, wherein the reversing logic (14) is part of the microcomputer (10,10').

5. The digital control unit according to claim 3, wherein the reversing logic (14) is designed and arranged to path signals among the microcomputer (10, 10'), the main storage (12), and the auxiliary storage (13).

6. The digital control unit according to claim 1, wherein the interface (21) includes a serial interface (21).

7. The digital control unit according to claim 6, wherein the load instruction includes a pre-set signal or a pre-set signal sequence input to the serial interface (21) from an external device.

8. The digital control unit according to claim 1, wherein the load instruction includes a signal from a switch (23) that is connected to the microcomputer (10,10').

9. The digital control unit according to claim 7 or 8, wherein the control program includes a testing program for determining the presence of a load instruction.

10. The digital control unit according to claim 1, wherein the control program includes a utility program for maintaining control functions if the contents of the main storage (12) are unavailable.

11. The digital control unit according to claim 1, wherein the auxiliary storage (13) includes a permanent storage external to the microcomputer (10,10').

12. The digital control unit according to claim 1, wherein the main storage (12) includes a read/write memory external to the microcomputer (10,10').

13. The digital control unit according to claim 1, wherein the main storage (12) includes a RAM or an EEPROM.

14. The digital control unit according to claim 13, wherein the main storage (12) includes a RAM connected to a storage battery.

15. The digital control unit according to claim 1, wherein the auxiliary storage (13) includes a ROM or an EPROM.

16. The digital control unit according to claim 1, wherein the auxiliary storage (13) includes a permanent storage internal to the microcomputer (10,10').

17. The digital control unit according to claim 1, wherein the main storage (12) includes a read/write memory internal to the microcomputer (10,10').

* * * * *